(12) United States Patent
Mitchell et al.

(10) Patent No.: US 6,259,971 B1
(45) Date of Patent: Jul. 10, 2001

(54) PORTABLE FUEL-CELL-POWERED SYSTEM WITH ULTRASONIC ATOMIZATION OF $H_2O$ BY-PRODUCT

(75) Inventors: Nathan Mitchell, The Woodlands; Joseph F. Freiman, Cypress, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/885,253

(22) Filed: Jun. 30, 1997

(51) Int. Cl.⁷ .................. G05D 11/00; G05D 17/00; G05D 3/12; G05D 5/00
(52) U.S. Cl. .................. 700/286; 700/195; 428/570; 428/402; 428/627; 428/634; 423/439; 429/42; 429/44
(58) Field of Search .................. 700/286, 195; 239/102.2, 338, 416.5, 220–223; 429/218.1, 231.2, 42, 44; 428/570, 402, 627, 634, 670, 673; 423/439

(56) References Cited

U.S. PATENT DOCUMENTS

| | | | |
|---|---|---|---|
| 3,860,173 | * 1/1975 | Sata | 239/102.2 |
| 5,064,732 | * 11/1991 | Meyer | 429/13 |
| 5,648,601 | * 7/1997 | Katoh et al. | 73/1 |
| 5,795,679 | * 8/1998 | Kawakami et al. | 429/218.1 |
| 6,103,393 | * 8/2000 | Kodas et al. | 428/570 |

OTHER PUBLICATIONS

McElroy et al., "SPE Regenerative Hydrogen/Oxygen Fuel Cells", IEEE., pp. 143–148, 1989.*
Hirschenhofer, "How The Fuel Cell Produces Power", IEEE., pp. 24–25, 1992.*
Jacobs et al., "Portable Power Source Needs of the Future Army–Batteries and Fuel Cells", IEEE., pp. 101–105, 1995.*
McElroy, "SPE Regenerative Hydrogen/Oxygen Fuel Cells for Extraterrestrial Surface Applications", IEEE., pp. 1631–1636, 1989.*
Carrasco et al., "Microcomputer Control of a Fuel Cell Power", IEEE., pp. 473–478, 1994.*
Taschek et al., "Fuel Cells For Mobile Electric Power", IEEE., pp. 50–53, 1986.*
Tilton et al., "Spray Cooling For the 3–D Cube Computer", IEEE., pp. 169–178, 1994.*
Carey et al., "Enhanced Mission Duration For An Underwater Vehicle Using A PEM", IEEE., pp. 105–108, 1990.*
Tsai et al. "Ustrasound–Modulated Twin–Fluid Jet Atomization", IEEE., pp. 1085–1089, 1995.*
Lal et al., Micromachined Silicon Ultrasonic Atomizer, 1996, IEEE., pp. 339–342.*
Mital et al., High Efficiency Multifuel Combustor With Potential For Commercial And Military Applications, 1997, IEEE., pp. 949–954.*
Hirakawa et al., Generation of Fine Dry Toner and it's Charging Characteristics., 1996, IEEE., pp. 2026–2030.*
R. Jacobs et al., IEEE AES Systems Magazine, Jun. 1996.

* cited by examiner

Primary Examiner—William A. Cuchlinski, Jr.
Assistant Examiner—McDieunel Marc
(74) Attorney, Agent, or Firm—Fletcher, Yoder & Van Someren

(57) ABSTRACT

A portable electronic system which obtains power from a dry-electrolyte fuel cell. Water which is produced by the fuel cell is atomized by an ultrasonic transducer, to avoid user inconvenience due to reservoirs or dripping.

25 Claims, 2 Drawing Sheets

PORTABLE FUEL-CELL-POWERED SYSTEM WITH ULTRASONIC ATOMIZATION OF H₂O BY-PRODUCT

BACKGROUND AND SUMMARY OF THE INVENTION

The present application relates to low-power portable fuel cells.

Background: Fuel Cells

A fuel cell is an electrochemical power source which is very attractive for many applications. A fuel cell may be regarded as a type of battery, but is significantly different from most common battery chemistries.

All batteries derive energy from a chemical reaction of some sort. In a fuel cell, the chemical reaction is the oxidation of a gaseous or liquid fuel (typically hydrogen), which may be supplied from an external supply. Thus, fuel cells can avoid the lifetime constraints of primary (non-rechargeable) batteries while also avoiding the degradation due to recharging and discharging which affects most rechargeable battery chemistries. The chemical reactions used in fuel cells are relatively energetic, and thus the amount of energy per unit weight is relatively high.

Much of the work on fuel cells has been directed towards larger fuel cells, in the range of a kilowatt to tens of kilowatts or more. However, the high energy density of fuel cell chemistries also makes them attractive for many portable applications, in which the energy requirements are far smaller. In particular, the development of gel-stabilized fuel cell technologies has made fuel cells much more attractive for portable applications. In such applications, the requirements of user convenience and comfort are crucial.

The oxidation of hydrogen produces water. Methanol and other hydrocarbon fuels have been proposed for fuel cells, but oxidation of any hydrocarbon fuel will produce water (as well as carbon dioxide, which is gaseous and not a problem). A fuel cell will also produce some heat, and some of the water produced will be water vapor rather than liquid water. However, some of the water vapor will condense as liquid water (either in the fuel cell plumbing, or shortly afterwards as the exhaust vapor cools). Thus liquid water will be generated.

The generation of liquid water is a significant problem: users do not want a computer which drips on their paperwork. The total flow of water is very small—on the order of one drop per minute, for 50 W of power—but this is enough to be a serious nuisance in some applications.

FIG. 1 shows a typical small fuel cell for portable applications. This cell is supplied with air and hydrogen. A container 100 holds a proton transport membrane 102. The transport membrane 102 can be, for example, a sulfonated styrene/ethylene/butylene-styrene triblock copolymer from DAIS. The membrane 102 is flanked by a porous cathode 104 and a porous anode 106. (These are made of a porous conductive material, e.g. carbon fibers.) Hydrogen, supplied to fuel manifold 110 through inlet 114, is catalytically ionized at the interface between anode 106 and membrane 102. Hydrogen can then be transported through membrane 102 as protons (hydrogen ions). Similarly, oxygen is introduced through inlet 116 into oxidant manifold 112, and is absorbed at the interface between membrane 102 and cathode 104, to form oxygen ions within membrane 102. The oxygen ions and protons react to form water, which is exuded into the oxidant manifold. Typically an excess of air is pumped into inlet 116, so the exhaust port 118 carries air which is only partly deoxygenated, as well as moisture from the reaction. The free energy from the reaction can be extracted electrically at terminals V+ and V−. The voltage per cell will be in the neighborhood of 0.6 V to 1.1 V, depending on load characteristics and cell design.

The drawing of FIG. 1 is highly simplified. Since the membrane 102 generates only a small current per square inch, the membrane is typically folded back and forth many times. Thus the manifolds 110 and 112 will typically be long meandering passages, where condensed water can easily block gas flow. Additional pressure is therefore applied to the inputs occasionally, to produce a puff at the exhaust port which vents excess water.

Additional background on fuel cell technology can be found in Kordesh and Simader, FUELCELLS AND THEIR APPLICATIONS (1996); the HANDBOOK OF BATTERIES AND FUEL CELLS (ed. Linden 1984); in the proceedings of the Grove Fuel Cell Symposia; and in the proceedings of the Annual Battery Conference on Applications and Advances; all of which are hereby incorporated by reference.

Innovative Portable Fuel Cell System

The present invention provides a portable fuel cell-powered system in which the water by-product is disposed of by ultrasonic vaporization. Users will object to the presence of liquid water (or to the presence of steam), but ultrasonic vaporization provides a very convenient way to expel H₂O without the difficulties of handling liquid water in an office environment. Preferably a piezoelectric element is used to vaporize the water by-product, and a small port is used to eject the vapor thus produced.

In one class of embodiments, a heated airstream is combined with the water vapor exhaust port to reduce the chances of liquid water accumulating.

In another class of embodiments, the water byproduct is transported as a very-low-volume liquid flow to a vaporization orifice on the exterior of the system, where an ultrasonic transducer atomizes and expels the water.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
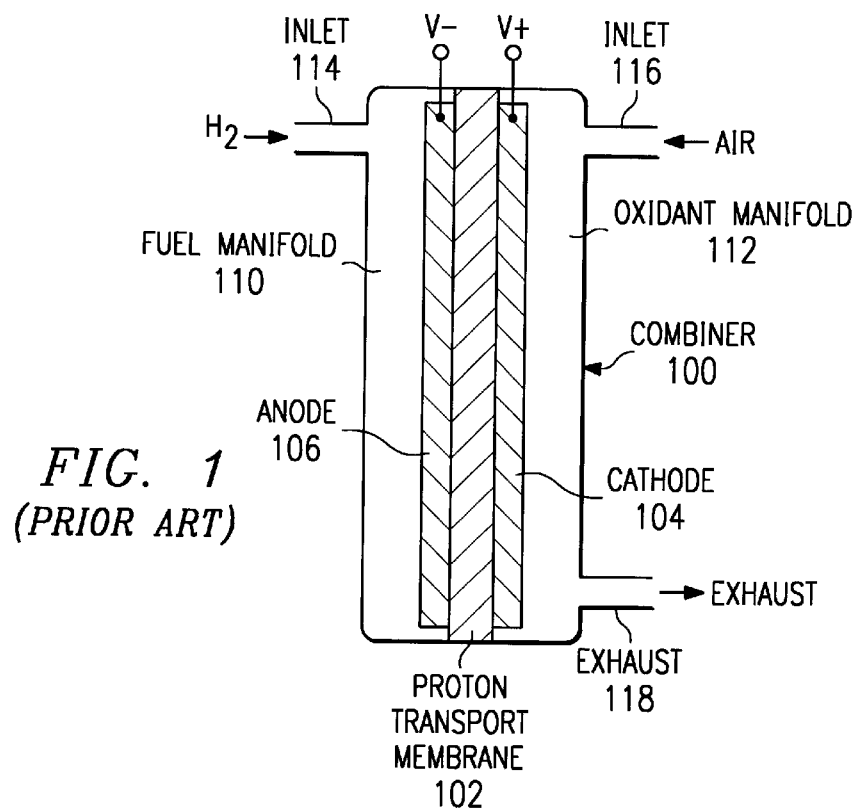
FIG. 1 shows a typical small fuel cell for portable applications.
Figure 2:
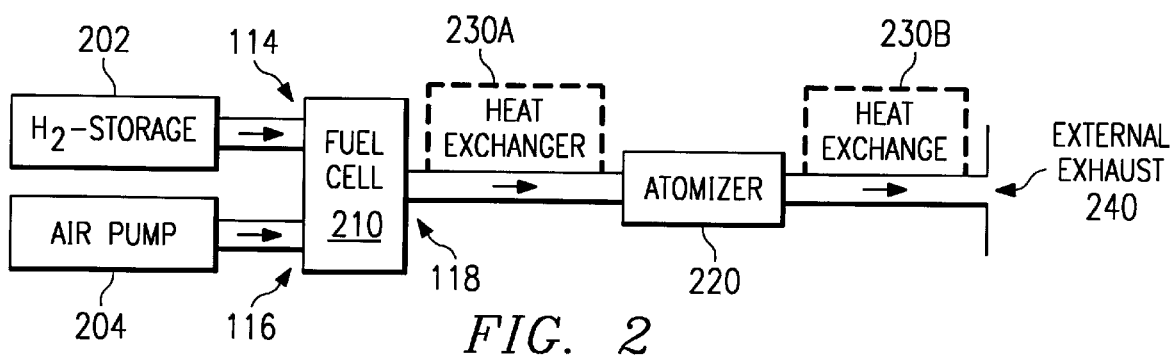
FIG. 2 shows fuel cells and water discharge path in a first class of embodiments.
Figure 3:
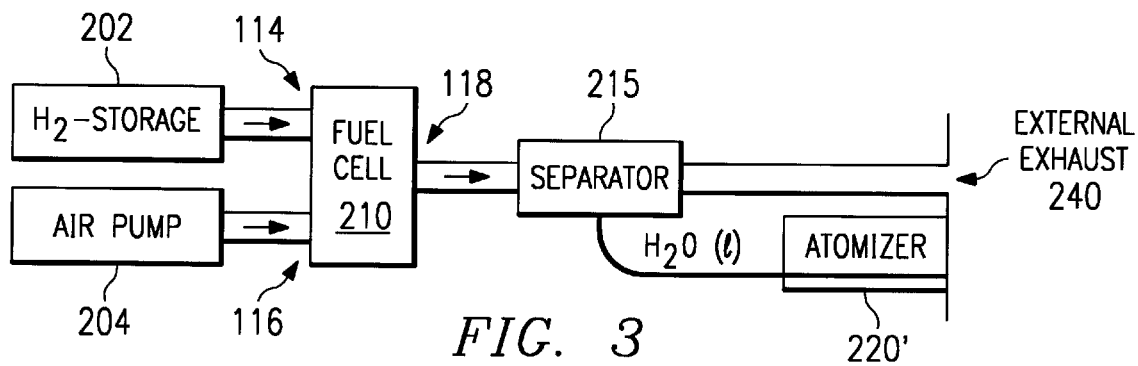
FIG. 3 shows fuel cells and water discharge path in a second class of embodiments.
Figure 4:
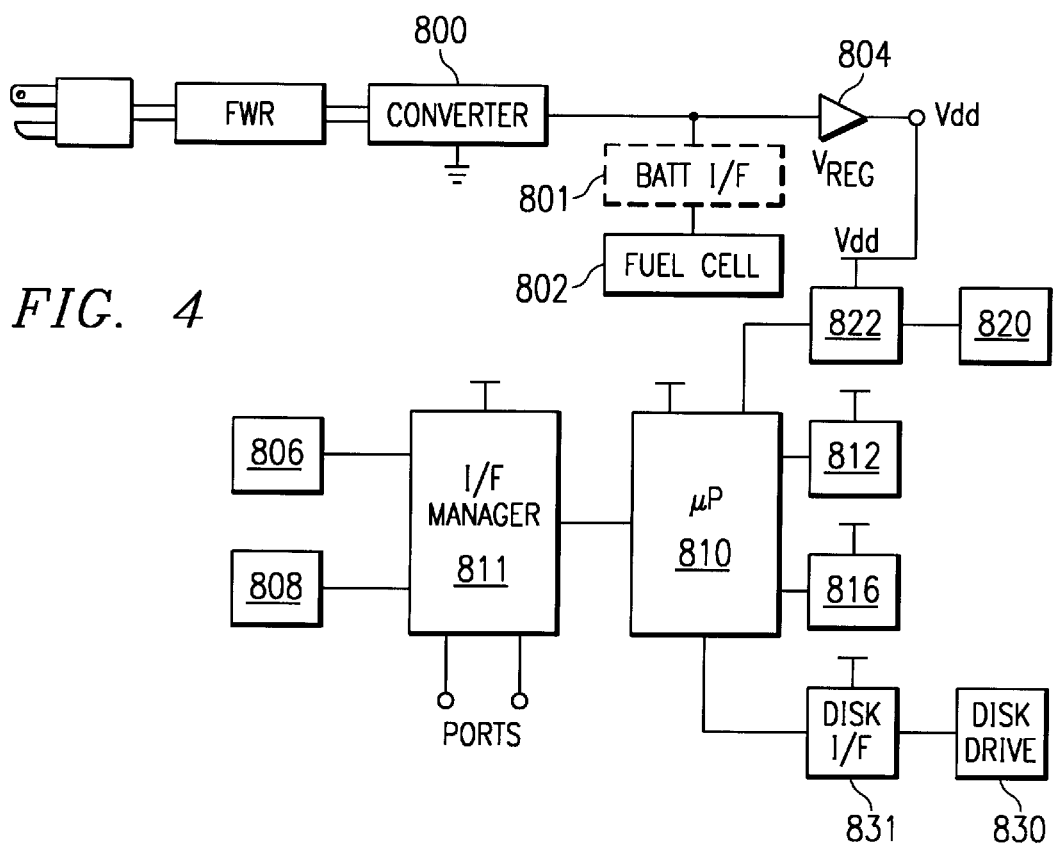
FIG. 4 shows a block diagram of a portable computer system according to the presently preferred embodiment.

FIG. 2 shows a fuel cell and its water discharge path in a first class of embodiments. Fuel cell 210 is supplied (at inlet 114) by hydrogen from a hydrogen-storage reservoir 202, and (at inlet 116) with air from air pump 204. The exhaust port 118 releases moist air and water droplets.

An atomizer 220 includes a resonant piezoelectric transducer. The transducer is driven at an ultrasonic frequency, e.g. 100 KHz, which atomizes water droplets. Thus any liquid-phase water in the gas flow exiting the atomizer 220 will be in the form of very small droplets.

A heat exchanger 230B preferably follows the atomizer 220. This heat exchanger is coupled to the portable computer's CPU by a heat pipe, so it imparts a thermal rise to the gas flow exiting the atomizer. This helps to prevent condensation in or near the computer.

Alternatively a heat exchanger 230A can be located before the atomizer, instead of or in addition to the following heat exchanger 230B. Here too the primary purpose is to prevent condensation. However, a side benefit is that a small amount of extra cooling for the computer can be obtained.

The flow of moist air is finally discharged through an external exhaust port 240.

FIG. 3 shows a fuel cell and its water discharge path in a second class of embodiments. In this class of embodiments the fuel cell 210 is followed by a separator 215 which extracts liquid water from the gas flow. (Alternatively, the separator 215 can be integrated into the fuel cell 210, so that liquid water is produced at a separate outlet of the fuel cell 210.) The small flow of liquid water is then fed directly to an atomizer 220', which atomizes and expels the water. The gas flow is simply exhausted directly through an external port 240.

FIG. 4 shows a portable computer including a power converter 800 to operate from AC power, when available, and from fuel cell 802. The power converter is connected, through a full-wave bridge rectifier FWR, to draw power from AC mains. The fuel cell 802 (or the converter 800), connected through a voltage regulator 804, is able to power the complete portable computer system, which includes. in this example:

user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

According to a disclosed class of innovative embodiments, there is provided: A portable electronic system, comprising: electronic operating circuits which perform one or more functions; a fuel cell operatively connected to provide power to said operating circuits; and an ultrasonic atomizer which uses ultrasonic energy to atomize any liquid water produced by said fuel cell.

According to another disclosed class of innovative embodiments, there is provided: A computer system, comprising: a user input device; a microprocessor operatively connected to detect inputs from said input device; memory which is connected to be read/write accessible by said microprocessor; a video controller connected to said microprocessor; a display operatively connected to display data generated by said video controller at a first refresh rate; a fuel cell;

a power supply connected to provide power from said fuel cell to said microprocessor, said memory, and said display; and an ultrasonic atomizer which uses ultrasonic energy to atomize any liquid water produced by said fuel cell.

According to another disclosed class of innovative embodiments, there is provided: A method for operating a fuel cell, comprising the steps of: (a.) supplying an oxidant and a fuel which contains hydrogen to a dry-electrolyte membrane; (b.) allowing an electrochemical reaction to occur at said membrane in which hydrogen is oxidized to form water; and (c.) atomizing any water condensate from the cell by applying ultrasonic energy thereto, and expelling atomized water into the ambient air.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

Optionally a reservoir can be used to buffer the flow of water, in combination with atomization, as described above, to get rid of it.

The disclosed inventions can be applied to a wide variety of dry portable fuel cells. For example, the disclosed inventions can also be applied to fuel cell technologies which use a solid-oxide transport medium.

What is claimed is:

1. A computer system, comprising:

a user input device;

a microprocessor operatively connected to detect inputs from said input device;

memory which is connected to be read/write accessible by said microprocessor;

a video controller connected to said microprocessor;

a display operatively connected to display data generated by said video controller at a first refresh rate;

a fuel cell;

a power supply connected to provide power from said fuel cell to said microprocessor, said memory, and said display; and an ultrasonic atomizer which uses ultrasonic energy to atomize any liquid water produced by said fuel cell.

2. The computer system of claim 1, further comprising:

a heat exchanger coupled to said microprocessor.

3. The computer system of claim 1, further comprising:

a heat exchanger connected between said fuel cell and said atomizer.

4. The computer system of claim 1, further comprising:

a heat exchanger connected between said atomizer and an external exhaust.

5. The computer system of claim 1, further comprising: a seperator coupled to said fuel cell and to said atomizer.

6. The computer system of claim 1, wherein:

said ultrasonic atomizer includes a resonant piezoelectric transducer driven at an ultrasonic frequency.

7. A method for operating a portable computer system, comprising the acts of:

operating a portable computer system having a fuel cell;

ultrasonically atomizing any liquid water formed by the fuel cell; and releasing atomized water from the portable computer system.

8. The method as recited in claim 7, wherein the fuel cell comprises an oxidant and a fuel.

9. The method as recited in claim 7, wherein the oxidant comprises air and the fuel comprises hydrogen.

10. The method as recited in claim 7, wherein the act of ultrasonically atomizing comprises the act of driving a piezoelectric transducer at an ultrasonic frequency.

11. The method as recited in claim 7, comprising the act of:

separating liquid water from gaseous water produced by the fuel cell.

12. The method as recited in claim 7, wherein the act of releasing comprises the act of transporting the atomized water via a gas flow to the ambient air.

13. The method as recited in claim 12, comprising the act of heating the gas flow.

14. The method as recited in claim 7, wherein the act of releasing comprises the act of transporting the atomized water to ambient air pumped through the portable computer system.

15. A portable computer system, comprising:

a fuel cell adapted to supply electrical power for operating the portable computer system, wherein the fuel cell produces water as a by-product; and an atomizer adapted to vaporize the water for transport to a location external to the portable computer system.

16. The portable computer system as recited in claim 15, wherein the atomizer comprises a resonant piezoelectric transducer driven at an ultrasonic frequency.

17. The portable computer system as recited in claim 15, comprising:

a separator adapted to separate at least a portion of the liquid phase water produced by the fuel cell from any gaseous phase water produced by the fuel cell, wherein the at least a portion of liquid-phase water is atomized by the atomizer.

18. The portable computer system as recited in claim 15, comprising:

a heat exchanger adapted to transfer heat to water produced by the fuel cell.

19. The portable computer system as recited in claim 15, wherein the fuel cell comprises:

an oxidant, hydrogen; and a membrane separating the oxidant and the hydrogen, the membrane being adapted to enable hydrogen protons to transit through the membrane.

20. The portable computer system as recited in claim 15, comprising an air pump adapted to supply air to the fuel cell and adapted to transport atomized water to ambient air surrounding the portable computer system.

21. A method for operating an electronic device, comprising the acts of:

providing the electronic device with power produced by the fuel cell; and atomizing water produced by the fuel cell with an ultrasonic atomizer.

22. The method as recited in claim 21, comprising:

discharging atomized water from the electronic device into ambient air.

23. The method as recited in claim 21, comprising:

supplying the fuel cell with an oxidant and hydrogen.

24. The method as recited in claim 23, wherein the oxidant is air.

25. The method as recited in claim 23, wherein the hydrogen is gaseous hydrogen.

* * * * *